United States Patent
Lee et al.

(10) Patent No.: US 10,949,046 B2
(45) Date of Patent: Mar. 16, 2021

(54) PRESSURE SENSOR AND DISPLAY DEVICE INCLUDING THE SAME

(71) Applicant: Samsung Display Co., Ltd., Yongin-Si (KR)

(72) Inventors: Kyung Su Lee, Yongin-si (KR); Jun Young Ko, Yongin-si (KR); Yeon Tae Kim, Yongin-si (KR); Eun Sol Seo, Yongin-si (KR); Jin Young Jeon, Yongin-Si (KR); In Young Han, Yongin-Si (KR)

(73) Assignee: Samsung Display Co., Ltd.

( * ) Notice: Subject to any disclaimer, the term of this patent is extended or adjusted under 35 U.S.C. 154(b) by 626 days.

(21) Appl. No.: 15/463,954

(22) Filed: Mar. 20, 2017

(65) Prior Publication Data

US 2018/0018039 A1    Jan. 18, 2018

(30) Foreign Application Priority Data

Jul. 15, 2016    (KR) .................. 10-2016-0090104

(51) Int. Cl.
*G06F 3/044*    (2006.01)
*G06F 3/041*    (2006.01)
*G01L 1/14*    (2006.01)

(52) U.S. Cl.
CPC ............ *G06F 3/0447* (2019.05); *G01L 1/142* (2013.01); *G06F 3/0443* (2019.05); *G06F 3/0445* (2019.05); *G06F 3/04166* (2019.05); *G06F 2203/04105* (2013.01)

(58) Field of Classification Search
CPC ..... G01L 1/142; G06F 3/0414; G06F 3/0416; G06F 3/044; G06F 2203/04105
See application file for complete search history.

(56) References Cited

U.S. PATENT DOCUMENTS

| 9,262,031 | B1 | 2/2016 | Moon et al. |
| 9,574,954 | B2 * | 2/2017 | Baker ................. G01L 1/16 |
| 2006/0197753 | A1 | 9/2006 | Hotelling |
| 2010/0013775 | A1 | 1/2010 | Son |
| 2011/0193363 | A1 * | 8/2011 | Nishiwaki ............ B25J 13/083 |
| | | | 294/86.4 |

(Continued)

FOREIGN PATENT DOCUMENTS

| EP | 2083472 A1 | 7/2009 |
| EP | 2472366 A1 | 4/2012 |

(Continued)

OTHER PUBLICATIONS

Extended European Search Report for application No. 17180934.6, dated Nov. 17, 2017.

(Continued)

*Primary Examiner* — Stacy Khoo
(74) *Attorney, Agent, or Firm* — Innovation Counsel LLP

(57) ABSTRACT

A pressure sensor including: a first conductor; a second conductor spaced apart from the first conductor, and positioned so as to form a capacitance with the first conductor; and an elastic member positioned between the first conductor and the second conductor, in which the capacitance varies according to a pressure applied to one or more of the first conductor and the second conductor, and the first conductor has a shape different from that of the second conductor.

25 Claims, 12 Drawing Sheets

(56) References Cited

U.S. PATENT DOCUMENTS

| | | |
|---|---|---|
| 2012/0038583 A1 | 2/2012 | Westhues et al. |
| 2013/0009653 A1* | 1/2013 | Fukushima ............. G06F 3/044 324/679 |
| 2013/0082970 A1 | 4/2013 | Frey et al. |
| 2014/0035849 A1 | 2/2014 | Jung et al. |
| 2014/0043289 A1 | 2/2014 | Stern |
| 2015/0048848 A1 | 2/2015 | Dawson et al. |
| 2015/0153895 A1 | 6/2015 | Hotelling |
| 2015/0199057 A1 | 7/2015 | Minami et al. |
| 2016/0035290 A1* | 2/2016 | Kim ...................... G06F 3/0412 345/174 |
| 2016/0150641 A1* | 5/2016 | Yoo ..................... H05K 1/0283 345/174 |
| 2016/0179259 A1* | 6/2016 | Watanabe .............. G06F 3/044 345/174 |
| 2016/0179276 A1* | 6/2016 | Nathan ................. G06F 3/0414 345/174 |
| 2016/0291761 A1 | 10/2016 | Huie |
| 2016/0306464 A1* | 10/2016 | Lee ......................... G06F 3/044 |
| 2016/0378259 A1 | 12/2016 | Schediwy et al. |

FOREIGN PATENT DOCUMENTS

| | | |
|---|---|---|
| EP | 2930597 A2 | 10/2015 |
| EP | 2975374 A1 | 1/2016 |
| EP | 2983067 A1 | 2/2016 |
| KR | 10-2013-0109090 A | 10/2013 |
| KR | 10-1598412 B1 | 2/2016 |
| WO | 2011142332 A1 | 11/2011 |

OTHER PUBLICATIONS

Extended European Search Report for application No. 17181129.2, dated Nov. 21, 2017.

European Communication corresponding to European Patent Application No. 17180934.6 dated Jan. 22, 2020 6 pages.

* cited by examiner

| A_SR | 8295.97mm² |
|---|---|
| A_Lt | 846.7mm² |
| R_R1 | 10% |
| R_R2 | 22% |
| R_R3 | 34% |
| R_R4 | 55% |

| Ctotal | 88.1pF |
|---|---|
| △C_R1 | 0.043pF |
| △C_R2 | 0.063pF |
| △C_R3 | 0.051pF |
| △C_R4 | 0.048pF |

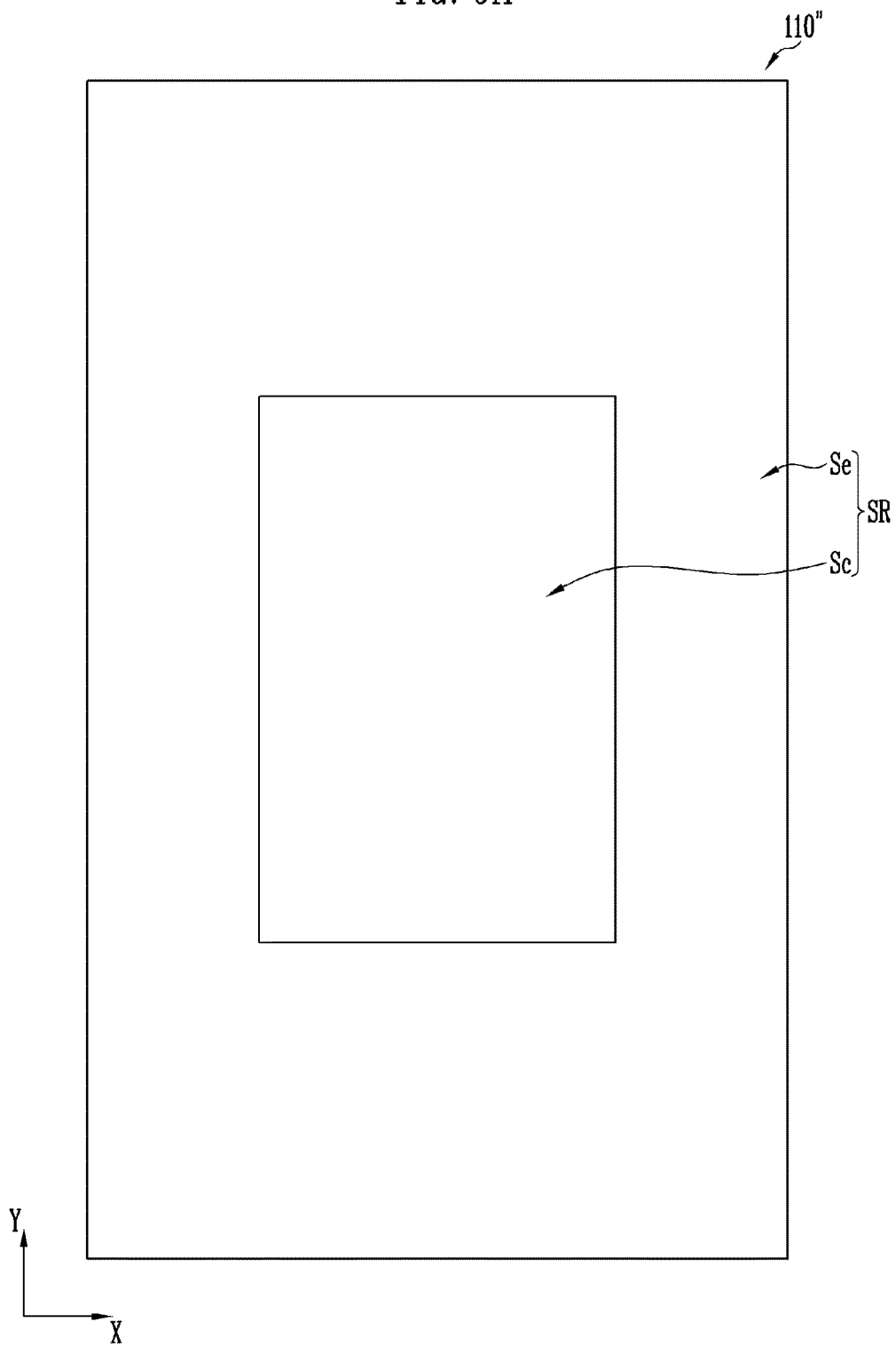

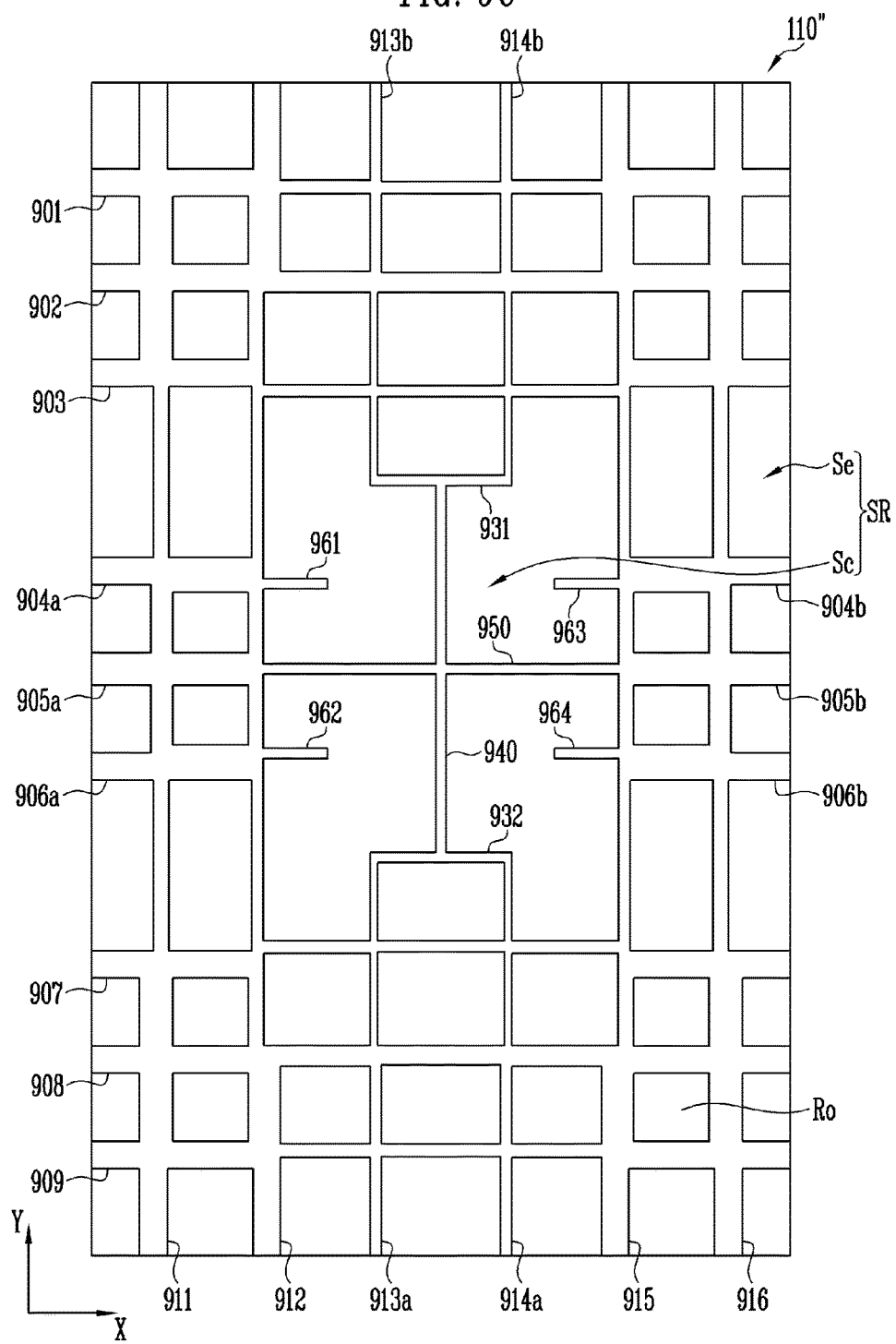

PRESSURE SENSOR AND DISPLAY DEVICE INCLUDING THE SAME

CROSS-REFERENCE TO RELATED APPLICATION

This application claims priority to, and the benefit of, Korean Patent Application No. 10-2016-0090104 filed on Jul. 15, 2016 in the Korean Intellectual Property Office, the entire contents of which are incorporated herein by reference in their entirety.

BACKGROUND

1. Field

The present disclosure relates generally to display devices, and more specifically to pressure sensors and display devices including the same.

2. Description of the Related Art

As interest in information display and use of portable information media has increased, research on and commercialization of display device has correspondingly increased.

A recent display device includes a touch sensor for receiving a touch of a user together with an image display function. A user is often capable of more conveniently using the display device when it is equipped with a touch sensor.

Further, recently, a display device tends to provide various functions to a user by using a pressure generated by a touch, as well as a touch position.

SUMMARY OF THE INVENTION

The present disclosure provides a pressure sensor which is capable of detecting a touch pressure, and a display device including the same.

The present disclosure also provides a pressure sensor which is capable of decreasing error in the recognition of a touch pressure, and a display device including the same.

An exemplary embodiment of the present disclosure provides a pressure sensor including: a first conductor; a second conductor spaced apart from the first conductor, and positioned so as to form a capacitance with the first conductor; and an elastic member positioned between the first conductor and the second conductor. The capacitance varies according to a pressure applied to one or more of the first conductor and the second conductor, and the first conductor has a shape different from that of the second conductor.

The first conductor may include: a plurality of nested loop-type conductive lines; and a plurality of connection conductive lines connected to the loop-type conductive lines.

The loop-type conductive lines may include: a first loop-type conductive line; a second loop-type conductive line positioned outside the first loop-type conductive line; a third loop-type conductive line positioned outside the second loop-type conductive line; and a fourth loop-type conductive line positioned outside the third loop-type conductive line.

The connection conductive lines may extend from the first loop-type conductive line to the fourth loop-type conductive line.

The first conductor may further include auxiliary conductive lines extending from the second loop-type conductive line to the fourth loop-type conductive line.

The first conductor may further include a plurality of additional conductive lines connected between the connection conductive lines.

At least one additional conductive line may be positioned between the first loop-type conductive line and the second loop-type conductive line.

The first conductor may further include lattice-shaped internal conductive lines which are positioned inside of the first loop-type conductive line, and may be connected to the first loop-type conductive line.

The loop-type conductive line may each have a quadrangular shape.

At least a part of the second loop-type conductive line may have a larger width than a width of the first loop-type conductive line.

At least a part of the third loop-type conductive line may have a larger width than a width of the second loop-type conductive line.

The capacitance may be 100 pF or less.

The first conductor may include: a plurality of first main conductive lines extending in a first direction; a plurality of second main conductive lines extending in a second direction crossing the first direction, and forming a plurality of opening regions between the first main conductive lines; and a plurality of sub conductive lines positioned in the opening regions.

The opening regions may include a first opening region spaced apart from a center of the first conductor by a predetermined distance, and a second opening region positioned farther from the center of the first conductor than the first opening region, and a number of sub conductive lines positioned in the second opening region may be larger than a number of sub conductive lines positioned in the first opening region.

The first main conductive lines and the second main conductive lines may cross, and be connected to, each other.

The sub conductive lines may include at least one of a first sub conductive line extending in the first direction and a second sub conductive line extending in the second direction.

The first sub conductive line may be connected between two adjacent second main conductive lines, and the second sub conductive line may be connected between two adjacent first main conductive lines.

The first conductor may be positioned in a pressure sensing region that includes a center region and an external region positioned at an external side of the center region.

The first conductor may include: first main conductive lines and second main conductive lines which are positioned in the external region and cross one another; first protruding conductive lines extending from a pair of first main conductive lines into the center region; and a first connection conductive line positioned in the center region, and connected between the first protruding conductive lines.

The first conductor may further include a second connection conductive line connected between a pair of second main conductive lines adjacent to the center region.

The first conductor may further include second protruding conductive lines extending from a pair of second main conductive lines into the center region.

Another exemplary embodiment of the present disclosure provides a display device including: a display panel; a touch sensor positioned at a first side of the display panel, and configured to detect a position of a touch; and a pressure sensor positioned at a second side of the display panel, and configured to detect a pressure of the touch, in which the pressure sensor may include: a first conductor; a second conductor spaced apart from the first conductor; and an elastic member positioned between the first conductor and the second conductor. The first conductor may have a shape different from that of the second conductor.

The display device may further include a bracket configured to accommodate the display panel, the touch sensor, and the pressure sensor.

The bracket may include the second conductor.

The first conductor may include: a plurality of nested loop-type conductive lines; and a plurality of connection conductive lines connected to the loop-type conductive lines.

The loop-type conductive lines may include: a first loop-type conductive line; a second loop-type conductive line positioned outside the first loop-type conductive line; a third loop-type conductive line positioned outside the second loop-type conductive line; and a fourth loop-type conductive line positioned outside the third loop-type conductive line.

The connection conductive lines may extend from the first loop-type conductive line to the fourth loop-type conductive line.

The first conductor may further include auxiliary conductive lines extending from the second loop-type conductive line to the fourth loop-type conductive line.

The first conductor may further include a plurality of additional conductive lines connected between the connection conductive lines.

At least one additional conductive line may be positioned between the first loop-type conductive line and the second loop-type conductive line.

The first conductor may further include lattice-shaped internal conductive lines which are positioned inside of the first loop-type conductive line, and may be connected to the first loop-type conductive line.

The loop-type conductive line may each have a quadrangular shape.

At least a part of the second loop-type conductive line may have a larger width than a width of the first loop-type conductive line.

At least a part of the third loop-type conductive line may have a larger width than a width of the second loop-type conductive line.

The first conductor may include: a plurality of first main conductive lines extending in a first direction; a plurality of second main conductive lines extending in a second direction crossing the first direction, and forming a plurality of opening regions between the first main conductive lines; and a plurality of sub conductive lines positioned in the opening regions.

The opening regions may include a first opening region spaced apart from a center of the first conductor by a predetermined distance, and a second opening region positioned farther from the center of the first conductor than the first opening region, and a number of sub conductive lines positioned in the second opening region may be larger than a number of sub conductive lines positioned in the first opening region.

The first main conductive lines and the second main conductive lines may cross, and be connected to, each other.

The sub conductive lines may include at least one of a first sub conductive line extending in the first direction and a second sub conductive line extending in the second direction.

The first sub conductive line may be connected between two adjacent second main conductive lines, and the second sub conductive line may be connected between two adjacent first main conductive lines.

The first conductor may be positioned in a pressure sensing region that includes a center region and an external region positioned at an external side of the center region.

The first conductor may include: first main conductive lines and second main conductive lines positioned in the external region and crossing one another; first protruding conductive lines extending from a pair of first main conductive lines into the center region; and a first connection conductive line positioned in the center region, and connected between the first protruding conductive lines.

The first conductor may further include a second connection conductive line connected between a pair of second main conductive lines adjacent to the center region.

The first conductor may further include second protruding conductive lines extending from a pair of second main conductive lines into the center region.

According to exemplary embodiments of the present disclosure, it is possible to provide a pressure sensor which is capable of detecting a touch pressure, and a display device including the same.

Further, according to exemplary embodiments of the present disclosure, it is possible to provide a pressure sensor which is capable of decreasing error in recognition of touch pressure, and a display device including the same.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. The various figures thus may not be to scale. It will be understood that when an element is referred to as being "between" two elements, it can be the only element between the two elements, or one or more intervening elements may also be present. Like reference numerals refer to like elements throughout.

FIGS. 9A, 9B, and 9C are diagrams describing a first conductor according to another exemplary embodiment of the present disclosure.

DETAILED DESCRIPTION OF THE INVENTION

Figure 1:
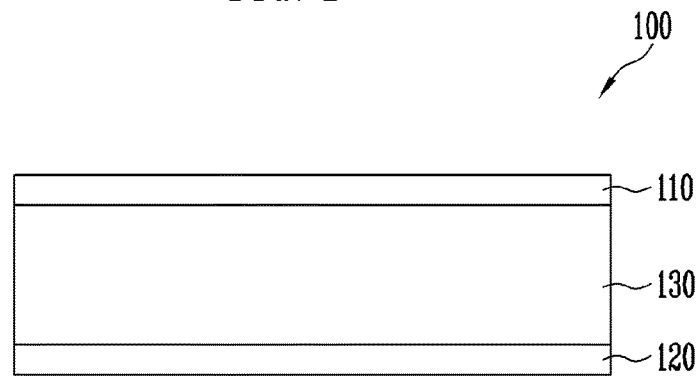
FIG. 1 is a diagram illustrating a pressure sensor according to an exemplary embodiment of the present disclosure.

Other detailed matters of the exemplary embodiments are included in the detailed description and the drawings.

Advantages and features of the present disclosure and methods accomplishing the advantages and features will become apparent from the following detailed description of exemplary embodiments with reference to the accompanying drawings. However, the present disclosure is not limited to the exemplary embodiment disclosed below and may be implemented in various different forms. Further, material ancillary to the present disclosure is sometimes omitted to clarify the description of the present disclosure, and like reference numerals designate like elements throughout the specification. All numerical values are approximate, and may vary. All examples of specific materials and compositions are to be taken as nonlimiting and exemplary only. Other suitable materials and compositions may be used instead.

Hereinafter, a pressure sensor, and a display device including the same according to an exemplary embodiment of the present disclosure, will be described with reference to the exemplary embodiments of the present disclosure and relevant drawings.

FIG. 1 is a diagram illustrating a pressure sensor according to an exemplary embodiment of the present disclosure.

Referring to FIG. 1, a pressure sensor 100 according to the exemplary embodiment of the present disclosure may include a first conductor 110, a second conductor 120, and an elastic member 130.

The first conductor 110 and the second conductor 120 may be spaced apart from each other. In this case, the first conductor 110 and the second conductor 120 may serve as capacitors, and a capacitance may be formed between the first conductor 110 and the second conductor 120.

The capacitance between the first conductor 110 and the second conductor 120 may be varied according to a distance between the first conductor 110 and the second conductor 120.

For example, when an external pressure (for example, a touch) is generated on the pressure sensor 100, a distance between the first conductor 110 and the second conductor 120 is changed in response to the external pressure, and thus the capacitance may be changed.

Accordingly, it is possible to recognize the amount of external pressure by detecting the variation in capacitance when the external pressure is generated.

The first conductor 110 and the second conductor 120 may include a conductive material. In the exemplary embodiment of the present disclosure, the conductive material may include a metal or an alloy thereof. The metal may include gold (Au), silver (Ag), aluminum (Al), molybdenum (Mo), chrome (Cr), titanium (Ti), nickel (Ni), neodymium (Nd), copper (Cu), platinum (Pt), and the like.

Alternatively, the first conductor 110 and the second conductor 120 may be formed of a transparent conductive material. The transparent conductive material may, for example, include a silver nano wire (AgNW), an Indium Tin Oxide (ITO), an Indium Zinc Oxide (IZO), an Antimony Zinc Oxide (AZO), an Indium Tin Zinc Oxide (ITZO), a Zinc Oxide (ZnC), a Tin Oxide ($SnO_2$), a carbon nano tube, a graphene, and the like. The first conductor 110 and the second conductor 120 may be formed in single layer or multi-layer configurations.

Further, the second conductor 120 may be formed of the same material as that of the first conductor 110, or may be formed of different materials.

For example, the second conductor 120 may have a plate or planar shape which may overlap the entirety of the first conductor 110.

FIG. 1 illustrates a case where the first conductor 110 is positioned at an upper side of the second conductor 120 as an example, but the first conductor 110 may also be positioned at a lower side of the second conductor 120.

The elastic member 130 may be positioned between the first conductor 110 and the second conductor 120.

For example, one surface of the elastic member 130 may be in contact with the first conductor 110, and the opposite surface of the elastic member 130 may be in contact with the second conductor 120.

The elastic member 130 may serve to relieve external impact, and to this end, the elastic member 130 may have an elasticity. For example, the elastic member 130 may be deformed by pressure from the outside, yet may return to its original state when the pressure from the outside is removed.

Further, the elastic member 130 may have an insulating property in order to prevent an electric short-circuit between the first conductor 110 and the second conductor 120.

The elastic member 130 may be provided with a porous polymer that provides its elasticity. For example, the elastic member 130 may be provided in a form of a foam body, such as a sponge.

As an example, the elastic member 130 may include thermoplastic elastomer, polystyrene, polyolefin, polyurethane thermoplastic elastomers, polyamides, synthetic rubbers, polydimethylsiloxane, polybutadiene, polyisobutylene, [poly(styrene-butadienestyrene)], polyurethanes, polychloroprene, polyethylene, silicone, and any combination thereof, but is not limited thereto.

Figure 2A:
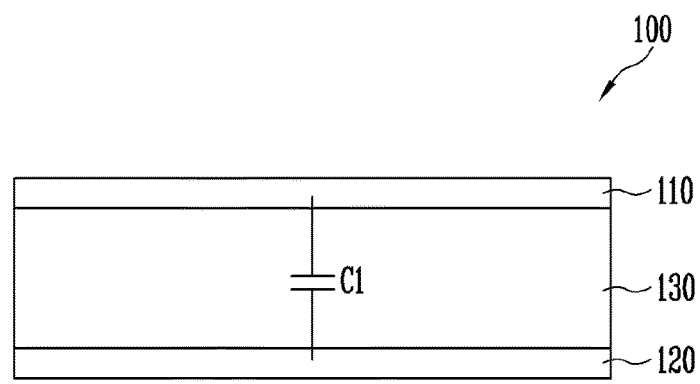
FIGS. 2A and 2B are diagrams for describing an operation of the pressure sensor illustrated in FIG. 1.
Figure 2B:
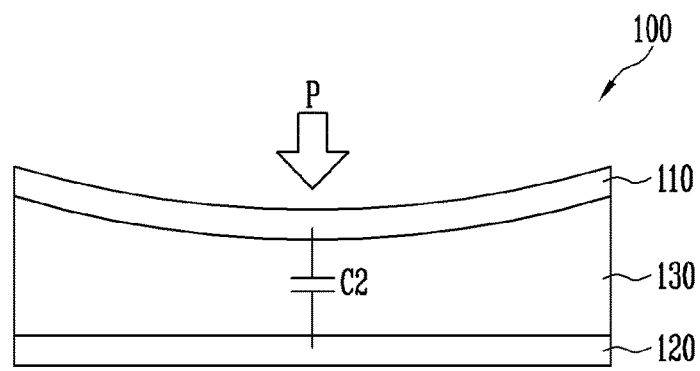

FIGS. 2A and 2B are diagrams describing an operation of the pressure sensor illustrated in FIG. 1. Particularly, FIG. 2A illustrates a state where a pressure P is not applied to the pressure sensor 100, and FIG. 2B illustrates a state where a pressure P is applied to the pressure sensor 100.

Referring to FIG. 2A, when the pressure P is not applied to the pressure sensor 100, first capacitance C1 may be formed between the first conductor 110 and the second conductor 120.

Referring to FIG. 2B, when the pressure P is applied to the pressure sensor 100 according to a touch of a user and the like, a distance between the first conductor 110 and the second conductor 120 may be changed, and thus, the capacitance between the first conductor 110 and the second conductor 120 may be changed. For example, the first capacitance C1 may be changed to second capacitance C2 by the applied pressure P.

Finally, when the external pressure P is increased, the capacitance of the first conductor 110 and the second conductor 120 may also be increased.

Accordingly, it is possible to detect an intensity of the pressure P and the like by detecting a change in the capacitance generated in the pressure sensor 100.

The pressure P applied to the pressure sensor 100 may be mainly generated by a touch of a user, but is not limited thereto, and the pressure P applied to the pressure sensor 100 may be generated by other various reasons or mechanisms.

Figure 3:
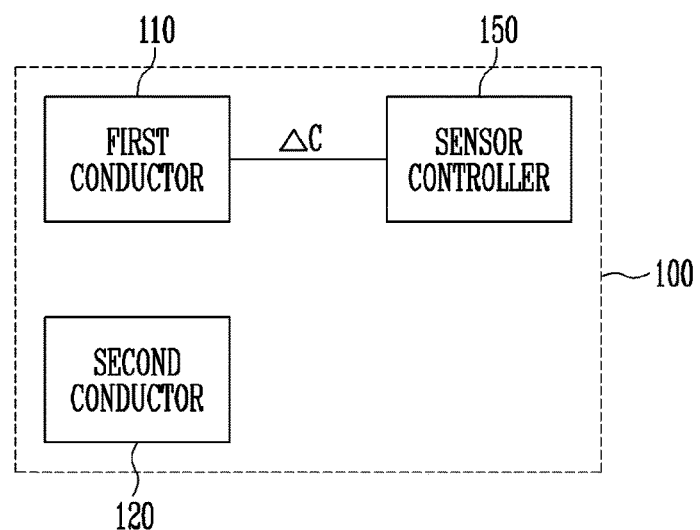
FIG. 3 is a diagram illustrating the pressure sensor including a sensor controller according to the exemplary embodiment of the present disclosure.

FIG. 3 is a diagram illustrating the pressure sensor including a sensor controller according to the exemplary embodiment of the present disclosure. Particularly, in FIG. 3, an illustration of the elastic member 130 is omitted for convenience in description.

Referring to FIG. 3, the pressure sensor 100 according to the exemplary embodiment of the present disclosure may further include a sensor controller 150.

The sensor controller 150 may detect a pressure applied to the pressure sensor 100 by sensing a variation AC in the capacitance existing between the first conductor 110 and the second conductor 120.

To this end, the sensor controller 150 may be connected to the first conductor 110.

For example, the sensor controller 150 may detect the variation AC in the capacitance by using an output signal of the first conductor 110.

Any method of detecting the variation AC of the capacitance may be employed. For example, the sensor controller 150 may be connected to the second conductor 120, not the first conductor 110. Further, the sensor controller 150 may be connected to both the first conductor 110 and the second conductor 120, so that it is also possible to detect the variation AC in the capacitance.

Figure 4:
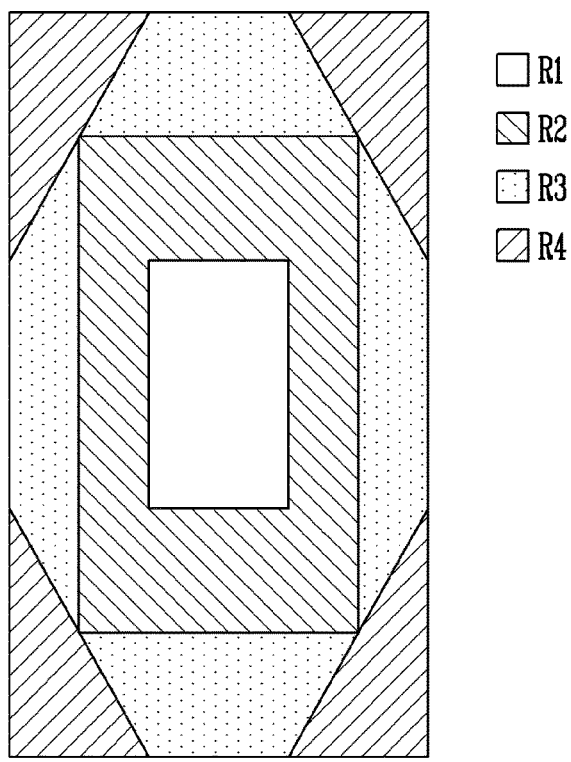
FIG. 4 is a diagram illustrating a pressure sensing region of the pressure sensor according to the exemplary embodiment of the present disclosure.

FIG. 4 is a diagram illustrating a pressure sensing region of the pressure sensor according to the exemplary embodiment of the present disclosure.

Referring to FIG. 4, the pressure sensor 100 according to the exemplary embodiment of the present disclosure may have a pressure sensing region SR.

The aforementioned first conductor 110, second conductor 120, and elastic member 130 may be disposed in the pressure sensing region SR. Thus, the pressure sensing region SR may be defined as a region to which a touch is input by a user.

However, due to a characteristic of the elastic member 130 and/or a member (for example, a bracket) for supporting the pressure sensor 100, even though the same pressure is applied, the degree (or the variation of the distance between the first conductor 110 and the second conductor 120) by which the elastic member 130 is deformed, may vary according to position within the pressure sensing region SR.

Accordingly, even though the same pressure is applied, the variation in the capacitance, which is generated for each position, is changed, so that the pressure which is actually recognized by the sensor controller 150 is also changed according to position.

For example, the pressure sensing region SR may be generally divided into four regions R1, R2, R3, and R4 based on the quantity of deformation in, or the variation of a thickness of, the elastic member 130.

First, the first sensing region R1 is a region positioned at a center of the pressure sensing region SR, and in a case where the same pressure is applied, the deformation of the elastic member 130 may be largest in the first sensing region R1 as compared to other sensing regions R2, R3, and R4.

The second sensing region R2 is a region positioned at an external side of (e.g. surrounding) the first sensing region R1, and when the same pressure is applied to the second sensing region R2, the quantity of deformation of the elastic member 130 is smaller than that of the first sensing region R1, but the quantity of deformation of the elastic member 130 may be larger than those of other sensing regions R3 and R4.

Further, the fourth sensing region R4 is a region positioned at each corner portion of the pressure sensing region SR, and receives the most fixing force by a support member of the pressure sensor 100, so that when the same pressure is applied to the fourth sensing region R4, the quantity of deformation of the elastic member 130 may be smallest as compared to those of other sensing regions R1, R2, and R3.

The third sensing region R3 is a remaining region existing between the second sensing region R2 and the fourth sensing region R4, and receives a part of fixing force by a support member of the pressure sensor 100, so that when the same pressure is applied to the third sensing region R3, the quantity of deformation of the elastic member 130 is smaller than that of the second sensing region R2, but the quantity of deformation of the elastic member 130 may be larger than that of the fourth sensing region R4.

For example, when the same touch pressure is applied to the first sensing region R1 and the second sensing region R2, the change in capacitance generated in the second sensing region R2 is smaller than that of the first sensing region R1.

This causes an error in pressure recognition, and in order to prevent such error, it is desirable to equally match the variation in capacitance in the second sensing region R2 to that of the first sensing region R1 by compensating for the variation in capacitance generated in the second sensing region R2.

That is, in order to increase the change in the capacitance generated in the second sensing region R2, an area of the first conductor 110 existing in the second sensing region R2 may be set to be larger than an area of the first conductor 110 existing in the first sensing region R1. The compensation method may also be applied to other sensing regions R3 and R4.

Hereinafter, a particular structure of the first conductor 110 designed by using the above compensation method will be described.

Figure 5:
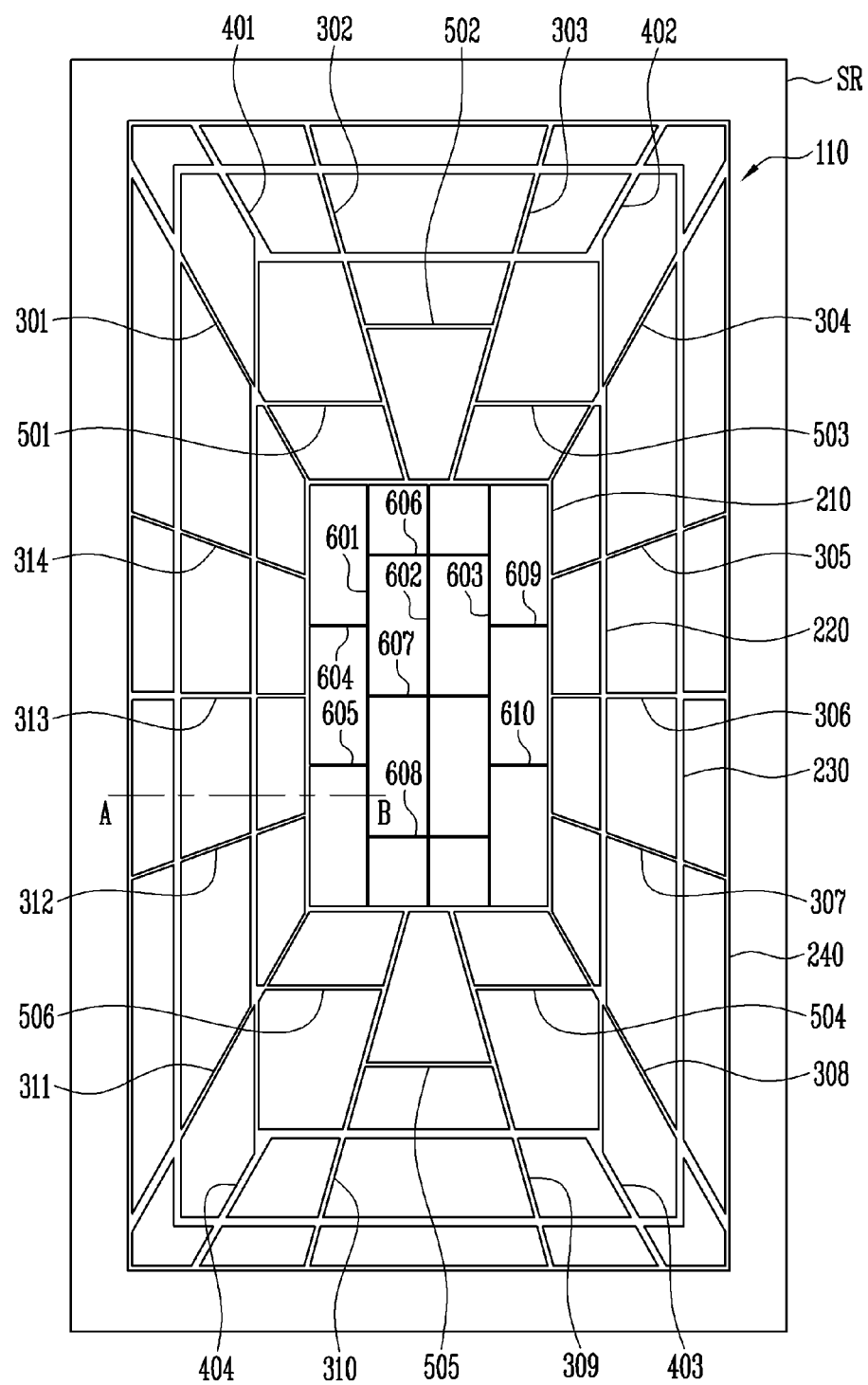
FIG. 5 is a diagram illustrating a first conductor according to the exemplary embodiment of the present disclosure.

FIG. 5 is a diagram illustrating the first conductor according to the exemplary embodiment of the present disclosure.

Referring to FIG. 5, the first conductor 110 according to the exemplary embodiment of the present disclosure may include a plurality of loop-type conductive lines 210, 220, 230, and 240.

The loop-type conductive lines 210, 220, 230, and 240 may be sequentially disposed toward the external side.

For example, the loop-type conductive lines 210, 220, 230, and 240 may include a first loop-type conductive line 210, a second loop-type conductive line 220, a third loop-type conductive line 230, and a fourth loop-type conductive line 240.

The first loop-type conductive line 210 may be positioned as the innermost line compared to other loop-type conductive lines 220, 230, and 240.

The second loop-type conductive line 220 may be positioned at an external side of the first loop-type conductive line 210, and may be spaced apart from the first loop-type conductive line 210 by a predetermined distance to surround the first loop-type conductive line 210.

The third loop-type conductive line 230 may be positioned at an external side of the second loop-type conductive line 220, and may be spaced apart from the second loop-type conductive line 220 by a predetermined distance to surround the second loop-type conductive line 220.

The fourth loop-type conductive line 240 may be positioned outside all of the other loop-type conductive lines 210, 220, and 230, and may be spaced apart from the third loop-type conductive line 230 by a predetermined distance to surround the third loop-type conductive line 230.

Each of the first to fourth loop-type conductive lines 210, 220, 230, and 240 may form a polygonal (for example, quadrangular) closed loop.

Further, the first conductor 110 according to the exemplary embodiment of the present disclosure may include a plurality of connection conductive lines 301 to 314 connected to the loop-type conductive lines 210, 220, 230, and 240.

Each of the connection conductive lines 301 to 314 may extend from the first loop-type conductive line 210 to the fourth loop-type conductive line 240.

For example, the connection conductive lines 301 to 314 may be radially extended from the first loop-type conductive line 210, and may be connected to the fourth loop-type conductive line 240 through the second loop-type conductive line 220 and the third loop-type conductive line 230.

Accordingly, the first to fourth loop-type conductive lines 210, 220, 230, and 240 may be electrically connected to one another through the connection conductive lines 301 to 314.

In this case, widths of the connection conductive lines 301 to 314 may be generally equal, or may vary depending on position.

For example, some of the connection conductive lines 301 to 314 may be set to have different widths from those of other connection conductive lines 301 to 314.

Further, a specific connection conductive line 301-314 may be set to generally have the same width as another line 301-314, or a part of a specific connection conductive line 301-314 may be set to have a different width from that of another part thereof.

The connection conductive lines 301 to 314 may include first to fourteenth connection conductive lines 301 to 314.

For example, the first to fourth connection conductive lines 301 to 304 may be connected to an upper side of the first loop-type conductive line 210, the fifth to seventh connection conductive lines 305 to 307 may be connected to a right side of the first loop-type conductive line 210, the eighth to eleventh connection conductive lines 308 to 311 may be connected to a lower side of the first loop-type conductive line 210, and the twelfth to fourteenth connection conductive lines 312 to 314 may be connected to a left side of the first loop-type conductive line 210.

Particularly, each of the first connection conductive line 301, the fourth connection conductive line 304, the eighth connection conductive line 308, and the eleventh connection conductive line 311 may be connected to a corner of the first loop-type conductive line 210.

Further, the first conductor 110 according to the exemplary embodiment of the present disclosure may include a plurality of auxiliary conductive lines 401 to 404.

Each of the auxiliary conductive lines 401 to 404 may extend from the second loop-type conductive line 220 to the fourth loop-type conductive line 240.

For example, the auxiliary conductive lines 401 to 404 may radially extend from the second loop-type conductive line 220, and may be connected to the fourth loop-type conductive line 240 through the third loop-type conductive line 230.

Accordingly, the second to fourth loop-type conductive lines 220, 230, and 240 may be electrically connected to one another through the auxiliary conductive lines 401 to 404.

In this case, widths of the auxiliary conductive lines 401 to 404 may be generally equal or may vary depending on position.

For example, some of the auxiliary conductive lines 401 to 404 may be set to have different widths from those of other auxiliary conductive lines 401 to 404.

Further, a specific auxiliary conductive line 401-404 may be set to generally have the same width, or a part of a specific auxiliary conductive line 401-404 may be set to have a different width from that of another part thereof.

The auxiliary conductive lines 401 to 404 may include first to fourth auxiliary conductive lines 401 to 404.

For example, each of the first to fourth auxiliary conductive lines 401 to 404 may be connected to a corner of the second loop-type conductive line 220.

Further, the first conductor 110 according to the exemplary embodiment of the present disclosure may include a plurality of additional conductive lines 501 to 506.

Each of the additional conductive lines 501 to 506 may be connected between the auxiliary conductive lines 401 to 404.

The additional conductive lines 501 to 506 may include first to sixth auxiliary conductive lines 501 to 506.

For example, the first additional conductive line 501 may be connected between the first connection conductive line 301 and the second connection conductive line 302, the second additional conductive line 502 may be connected between the second connection conductive line 302 and the third connection conductive line 303, and the third additional conductive line 503 may be connected between the third connection conductive line 303 and the fourth connection conductive line 304.

In this case, the first to third additional conductive lines 501 to 503 may be positioned between the first loop-type conductive line 210 and the second loop-type conductive line 220.

Further, the first to third additional conductive lines 501 to 503 may be formed to be parallel to the upper side of the first loop-type conductive line 210, and for example, may extend in a horizontal direction.

For example, the first additional conductive line 501 may be formed at a same horizontal position\as that of the third additional conductive line 503, and the second additional conductive line 502 may be positioned above the first and third additional conductive lines 501 and 503.

For example, the fourth additional conductive line 504 may be connected between the eighth connection conductive line 308 and the ninth connection conductive line 309, the fifth additional conductive line 505 may be connected between the ninth connection conductive line 309 and the tenth connection conductive line 310, and the sixth additional conductive line 506 may be connected between the tenth connection conductive line 310 and the eleventh connection conductive line 311.

In this case, the fourth to sixth additional conductive lines 504 to 506 may be positioned between the first loop-type conductive line 210 and the second loop-type conductive line 220.

Further, the fourth to sixth additional conductive lines 504 to 506 may be formed to be parallel to the lower side of the first loop-type conductive line 210, and for example, may extend in a horizontal direction.

For example, the fourth additional conductive line 504 may be formed at the same horizontal position as that of the sixth additional conductive line 506, and the fifth additional conductive line 505 may be positioned below the fourth and sixth additional conductive lines 504 and 506.

Further, the first conductor 110 according to the exemplary embodiment of the present disclosure may include internal conductive lines 601 to 610.

The internal conductive lines 601 to 610 may be positioned at an internal side of the first loop-type conductive line 210, and may be connected to the first loop-type conductive line 210.

Further, the internal conductive lines 601 to 610 may be disposed in a lattice type configuration.

The internal conductive lines 601 to 610 may include first to tenth internal conductive lines 601 to 610.

The first to third internal conductive lines 601 to 603 may be connected between the upper side and the lower side of the first loop-type conductive line 210. For example, the first to third internal conductive lines 601 to 603 may extend in a vertical direction.

The fourth and fifth internal conductive lines 604 and 605 may be connected between a left side of the first loop-type conductive line 210 and the first internal conductive line 601. For example, the fourth and fifth internal conductive lines 604 and 605 may extend in a horizontal direction.

The sixth to eighth internal conductive lines 606 to 608 may be connected between the first internal conductive line 601 and the third internal conductive line 603. For example, the sixth to eighth internal conductive lines 606 to 608 may extend from the first internal conductive line 601 to the third internal conductive line 603 through the second internal conductive line 602. Further, the sixth to eighth internal conductive lines 606 to 608 may extend in a horizontal direction.

The ninth and tenth internal conductive lines 609 and 610 may be connected between a right side of the first loop-type conductive line 210 and the third internal conductive line 603. For example, the ninth and tenth internal conductive lines 609 and 610 may extend in a horizontal direction.

For example, the fourth internal conductive line 604 may be formed at the same horizontal position as that of the ninth internal conductive line 609, and the fifth internal conductive line 605 may be formed at the same horizontal position as that of the tenth internal conductive line 610.

Further, the sixth internal conductive line 606 may be positioned above the fourth internal conductive line 604 and the ninth internal conductive line 609.

The seventh internal conductive line 607 may be positioned below the fourth internal conductive line 604 and the ninth internal conductive line 609, and may also be positioned above the fifth internal conductive line 605 and the tenth internal conductive line 610.

The ninth internal conductive line 608 may be positioned below the fifth internal conductive line 605 and the tenth internal conductive line 610.

The first to tenth internal conductive lines 601 to 610 may have a smaller width than that of the first loop-type conductive line 210.

Further, widths of the first to tenth internal conductive lines 601 to 610 may be generally equal, or may vary depending on positions.

For example, some of the first to tenth internal conductive lines 601 to 610 may be set to have different widths from those of other internal conductive lines 601 to 610.

Further, a specific internal conductive line may be set to generally have the same and/or constant width, or a part of a specific internal conductive line may be set to have a different width from that of another part thereof, or that of another line.

The first conductor 110 may be formed as a single electrode having a single output channel.

Figures 6, 7A, 7B:
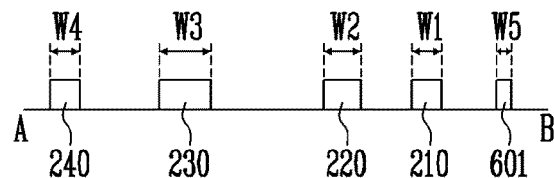
FIG. 6 is a diagram illustrating a cross-section of a part of the first conductor illustrated in FIG. 5.
FIGS. 7A and 7B are diagrams describing an experiment example of the pressure sensor adopting the first conductor illustrated in FIG. 5.

FIG. 6 is a diagram illustrating a cross-section of a part of the first conductor illustrated in FIG. 5. Particularly, FIG. 6 illustrates a cross-section of the first conductor 110 based on line A-B of FIG. 5.

Referring to FIG. 6, the first loop-type conductive line 210 may have a first width W1, the second loop-type conductive line 220 may have a second width W2, the third loop-type conductive line 230 may have a third width W3, and the fourth loop-type conductive line 240 may have a fourth width W4.

In this case, the first width W1, the second width W2, and the third width W3 may be different from each other. Referring to the above, the area of the first conductor 110 is to be increased from the center to the outer portion of the pressure sensing region SR, so that the second width W2 may be set to be larger than the first width W1, and the third width W3 may be set to be larger than the second width W2.

Further, the first internal conductive line 601 may have a fifth width W5, and the fifth width W5 may be set to be smaller than the first width W1.

In order to secure versatility of the sensor controller 150, the total capacitance of the first conductor 110 may be preferably set to 100 pF or less. In order to control the capacitance of the first conductor 110, the width W4 of the fourth loop-type conductive line 240 may be adjusted, and thus, the width W4 of the fourth loop-type conductive line 240 may be set to be smaller than the width W3 of the third loop-type conductive line 230.

FIGS. 7A and 7B are diagrams describing an experiment example of the pressure sensor adopting the first conductor illustrated in FIG. 5.

Referring to FIGS. 4, 5, and 7A, an experiment was performed by setting an area A_SR of the pressure sensing region SR and the total area A_Lt of the first conductor 110 positioned within the pressure sensing region SR to 8,295.97 mm$^2$ and 846.7 mm$^2$, respectively.

Further, in order to increase a variation in capacitance of the second to fourth sensing regions R2, R3, and R4 compared to the first sensing region R1, the area of the first conductor 110 existing within each of the second to fourth sensing regions R2, R3, and R4 was set to be large compared to the first sensing region R1.

For example, a ratio R_R1 of the area of the first conductor 110 existing within the first sensing region R1 to the area of the first sensing region R1, was set to 10%; a ratio R_R2 of the area of the first conductor 110 existing within the second sensing region R2 to the area of the first sensing region R1, was set to 20%; a ratio R_R3 of the area of the first conductor 110 existing within the third sensing region R3 to the area of the first sensing region R1, was set to 30%; and a ratio R_R4 of the area of the first conductor 110 existing within the fourth sensing region R4 to the area of the first sensing region R1, was set to 55%.

That is, the area of the first conductor 110 existing within the second sensing region R2 was set to about 2.2 times of the area of the first conductor 110 existing within the first sensing region R1, the area of the first conductor 110 existing within the third sensing region R3 was set to about 3.4 times of the area of the first conductor 110 existing within the first sensing region R1, and the area of the first conductor 110 existing within the fourth sensing region R4 was set to about 5.5 times of the area of the first conductor 110 existing within the first sensing region R1.

FIG. 7B lists total capacitance C_total of the first conductor 110 measured in the aforementioned structure, and capacitance changes ΔC_R1, ΔC_R2, ΔC_R3, and ΔC_R4 in the sensing regions R1, R2, R3, and R4, respectively, when the same pressure is applied to each of the sensing regions R1, R2, R3, and R4.

That is, the total capacitance C_total of the first conductor was measured as 88.1 pF, and the capacitance change ΔC_R1 of the first sensing region R1 was measured as 0.043 pF, the capacitance change ΔC_R2 of the second sensing region R2 was measured as 0.063 pF, the capacitance change ΔC_R3 of the third sensing region R3 was measured as 0.051 pF, and the capacitance change ΔC_R4 of the fourth sensing region R4 was measured as 0.048 pF.

When the first conductor 110 illustrated in FIG. 5 is adopted, a difference between the capacitance changes ΔC_R1, ΔC_R2, ΔC_R3, and ΔC_R4 is present within a similar range (for example, within 25%), so that it can be seen that the capacitance changes ΔC_R1, ΔC_R2, ΔC_R3, and ΔC_R4 in the sensing regions R1, R2, R3, and R4 are considerably uniform. Accordingly, it is possible to minimize an error in pressure recognition.

Figure 8A:
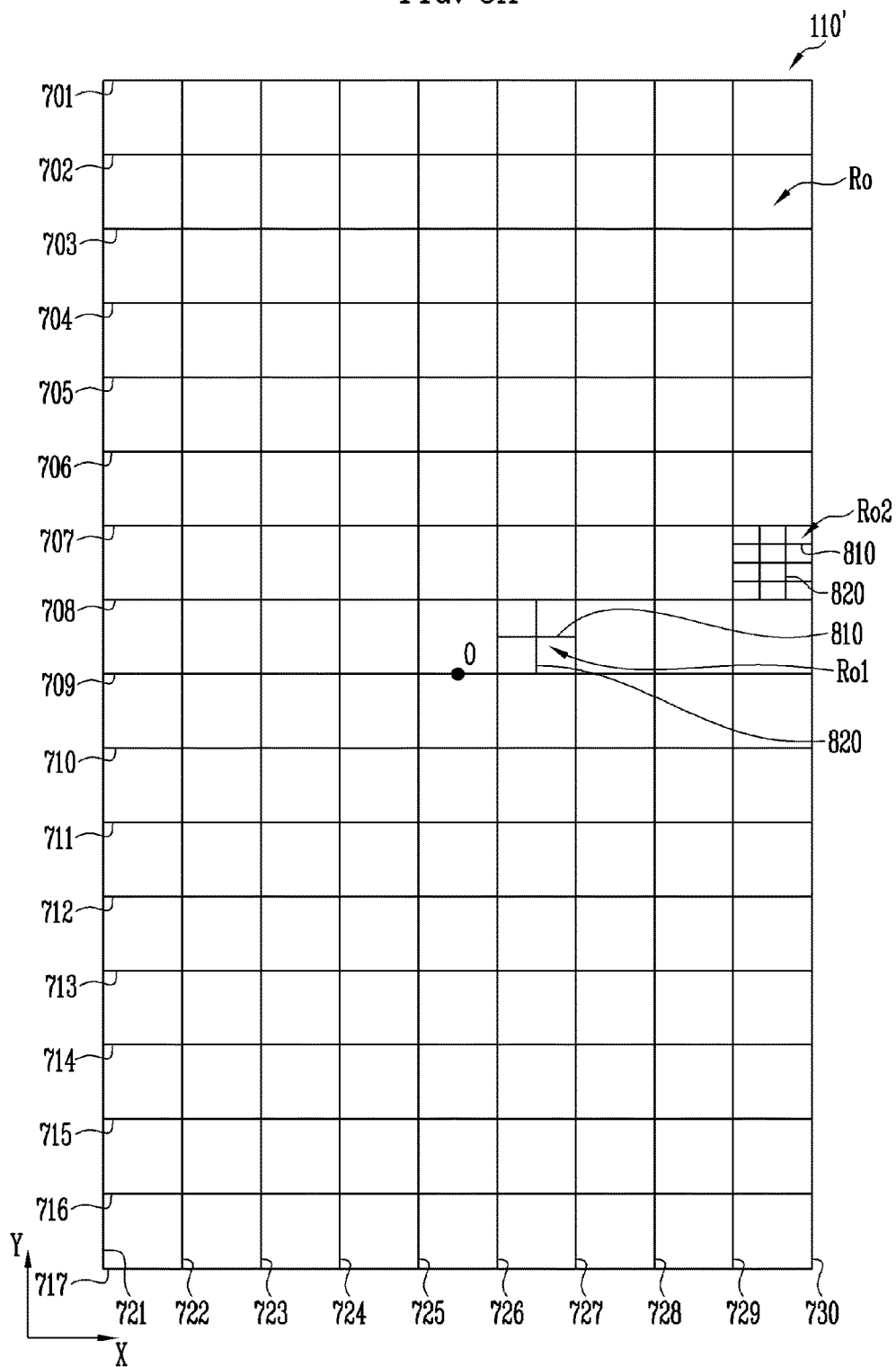
FIGS. 8A and 8B are diagrams describing a first conductor according to another exemplary embodiment of the present disclosure.
Figure 8B:
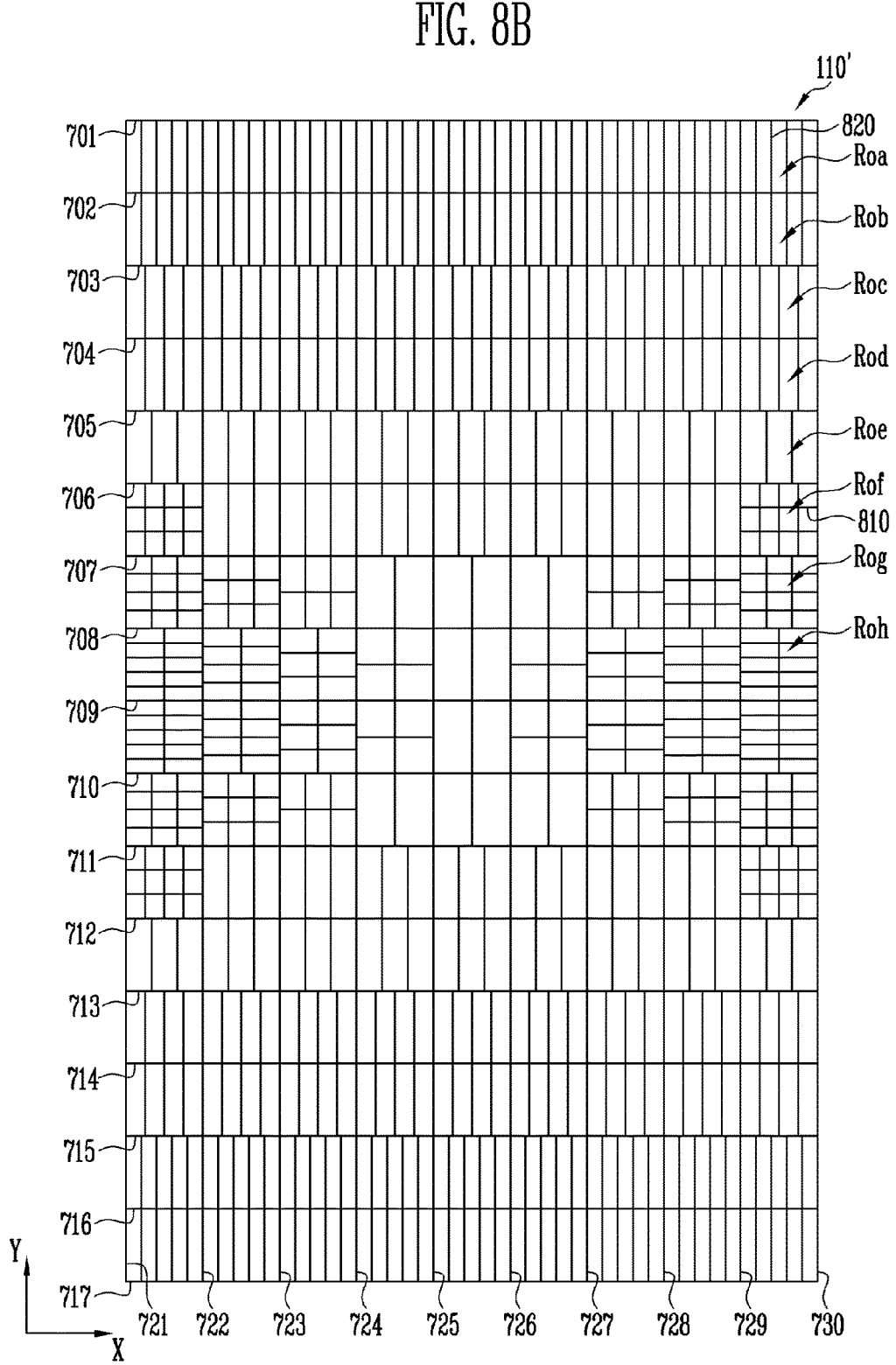

FIGS. 8A and 8B are diagrams for describing a first conductor according to another exemplary embodiment of the present disclosure.

For convenience of description, FIG. 8A illustrates sub conductive lines 810 and 820 existing in a first opening region Ro1 and a second opening region Ro2 of a first conductor 110', and FIG. 8B illustrates all of the sub conductive lines 810 and 820.

Referring to FIG. 8A, the first conductor 110' according to another exemplary embodiment of the present disclosure may include first main conductive lines 701 to 717, second main conductive lines 721 to 730, and the sub conductive lines 810 and 820.

The first main conductive lines 701 to 717 may extend in a first direction (for example, an X-axis direction).

The second main conductive lines 721 to 730 may extend in a second direction (for example, a Y-axis direction) crossing the first direction.

Accordingly, the first main conductive lines 701 to 717 and the second main conductive lines 721 to 730 may cross each other, and the crossing portions may be connected to each other.

Further, as the first main conductive lines 701 to 717 and the second main conductive lines 721 to 730 cross one another, a plurality of opening regions Ro are formed between the first main conductive lines 701 to 717 and the second main conductive lines 721 to 730.

For example, the opening regions Ro may include the first opening region Ro1, which is spaced apart from a center 0 of the first conductor 110' by a predetermined distance, and the second opening region Ro2, which is positioned farther from the center 0 than the first opening region Ro1.

The sub conductive lines 810 and 820 may be positioned in the opening regions Ro. Further, the sub conductive lines 810 and 820 may be connected between the two adjacent ones of the first main conductive lines 701 to 707, and/or may be connected between the two adjacent ones of the second main conductive lines 721 to 730.

For example, the sub conductive lines 810 and 820 may include second sub conductive lines 820 connected between two adjacent ones of the first main conductive lines 701 to 717, and first sub conductive lines 810 connected between two adjacent ones of the second main conductive lines 720 to 730.

In this case, the number of sub conductive lines 810 and 820 positioned in the second opening region Ro2 may be set to be larger than the number of sub conductive lines 810 and 820 positioned in the first opening region Ro1.

Accordingly, it is possible to increase the capacitance variation of the outer region of the first conductor 110', as compared to the center region of the first conductor 110', thereby minimizing error in pressure recognition.

For example, one second sub conductive line 820 connected between the two adjacent first main conductive lines 708 and 709 and one first sub conductive line 810 connected between the two adjacent second main conductive lines 726 and 727 are positioned in the first opening region Ro1, but two second sub conductive lines 820 connected between the two adjacent first main conductive lines 707 and 708 and two first sub conductive lines 810 connected between the two adjacent second main conductive lines 729 and 730 may be positioned in the second opening region Ro2.

A structure of the first conductor 110' will be described in more detail with reference to FIG. 8B.

First, n second sub conductive lines 820 may be positioned in each of the opening regions Roa positioned between the first first main conductive line 701 and the second first main conductive line 702.

Here, n may be set to an integer of 4 or more, and FIG. 8B illustrates a case where n is set to 4 as an example.

Further, n second sub conductive lines 820 may be positioned in each of the opening regions Rob positioned between the second first main conductive line 702 and the third first main conductive line 703.

Next, n-1 second sub conductive lines 820 may be positioned in each of the opening regions Roc positioned between the third first main conductive line 703 and the fourth first main conductive line 704.

Also, n-1 second sub conductive lines 820 may be positioned in each of the opening regions Rod positioned between the fourth first main conductive line 704 and the fifth first main conductive line 705.

Further, n-2 second sub conductive lines 820 may be positioned in each of the opening regions Roe positioned between the fifth first main conductive line 705 and the sixth first main conductive line 706.

Subsequently, n-2 or n-1 second sub conductive lines 820 may be positioned in each of the opening regions Rof positioned between the sixth first main conductive line 706 and the seventh first main conductive line 707.

For example, n-1 second sub conductive lines 820 and n-2 first sub conductive lines 810 may be positioned in the opening region Rof positioned between the first second main conductive lines 721 and the second second main conductive line 722, as well as the opening region Rof positioned between the ninth second main conductive lines 729 and the tenth second main conductive line 730. In contrast, n-2 second sub conductive lines 820 may be positioned in the remaining opening regions Rof.

Additionally, n-3 or n-2 second sub conductive lines 820 may be positioned in each of the opening regions Rog positioned between the seventh first main conductive line 707 and the eighth first main conductive line 708.

For example, n-3 second sub conductive lines 820 may be positioned in the opening region Rog positioned between the fifth second main conductive line 725 and the sixth second main conductive line 726, and the opening region Rog positioned between the sixth second main conductive line 726 and the seventh second main conductive line 727. In contrast, n-2 second sub conductive lines 820 and n-3 second sub conductive lines 710 may be positioned in the opening region Rog positioned between the seventh second main conductive line 727 and the eighth second main conductive line 728.

Further, n-2 second sub conductive lines 820 and n-2 first sub conductive lines 810 may be positioned in the opening region Rog positioned between the eighth second main conductive line 728 and the ninth second main conductive line 729, while n-2 second sub conductive lines 820 and n-1 first sub conductive lines 810 may be positioned in the opening region Rog positioned between the ninth second main conductive line 729 and the tenth second main conductive line 730.

The opening regions Rog positioned between the first second main conductive line 721 and the fifth second main conductive line 725 have bilaterally symmetric configurations, so that a detailed description thereof will be omitted.

In FIG. 8B, n-3 second sub conductive lines 820 may be positioned in each of the opening regions Roh positioned between the eighth first main conductive line 708 and the ninth first main conductive line 709.

Further, n-3 first sub conductive lines 810 may be positioned in the opening region Roh positioned between the sixth second main conductive line 726 and the seventh second main conductive line 727, and n-2 first sub conductive lines 810 may be positioned in the opening region Roh positioned between the seventh second main conductive line 727 and the eighth second main conductive line 728.

Further, n-1 first sub conductive lines 810 may be positioned in the opening region Roh positioned between the eighth second main conductive line 728 and the ninth second main conductive line 729, and n first sub conductive lines 810 may be positioned in the opening region Roh positioned between the ninth second main conductive line 729 and the tenth second main conductive line 730.

The opening regions Roh positioned between the first second main conductive line 721 and the fifth second main conductive line 725 have bilaterally symmetric configurations, so that a detailed description thereof will be omitted.

Further, the opening regions Ro positioned between the ninth first main conductive line 709 and the seventeenth first main conductive line 717 have configurations symmetric to those of the aforementioned opening regions Roa, Rob, Roc, Rod, Roe, Rof, Rog, and Roh, so that a detailed description thereof will be omitted.

In the meantime, widths of the first main conductive lines 701 to 717 and widths of the second main conductive lines 721 to 730 may be set to be the same as each other or different from each other.

For example, the widths of the first main conductive lines 701 to 717 and the widths of the second main conductive lines 721 to 730 may be set to be generally the same as each other, or may vary according to position.

Widths of the sub conductive lines 810 to 820 may be generally equal or may vary depending on position.

Further, the widths of the sub conductive lines 810 and 820 may be set to be the same as or different from those of the first main conductive lines 701 to 717 and/or the second main conductive lines 721 to 730.

The first conductor 110' may be formed as a single electrode having a single output channel.

Figure 9B:
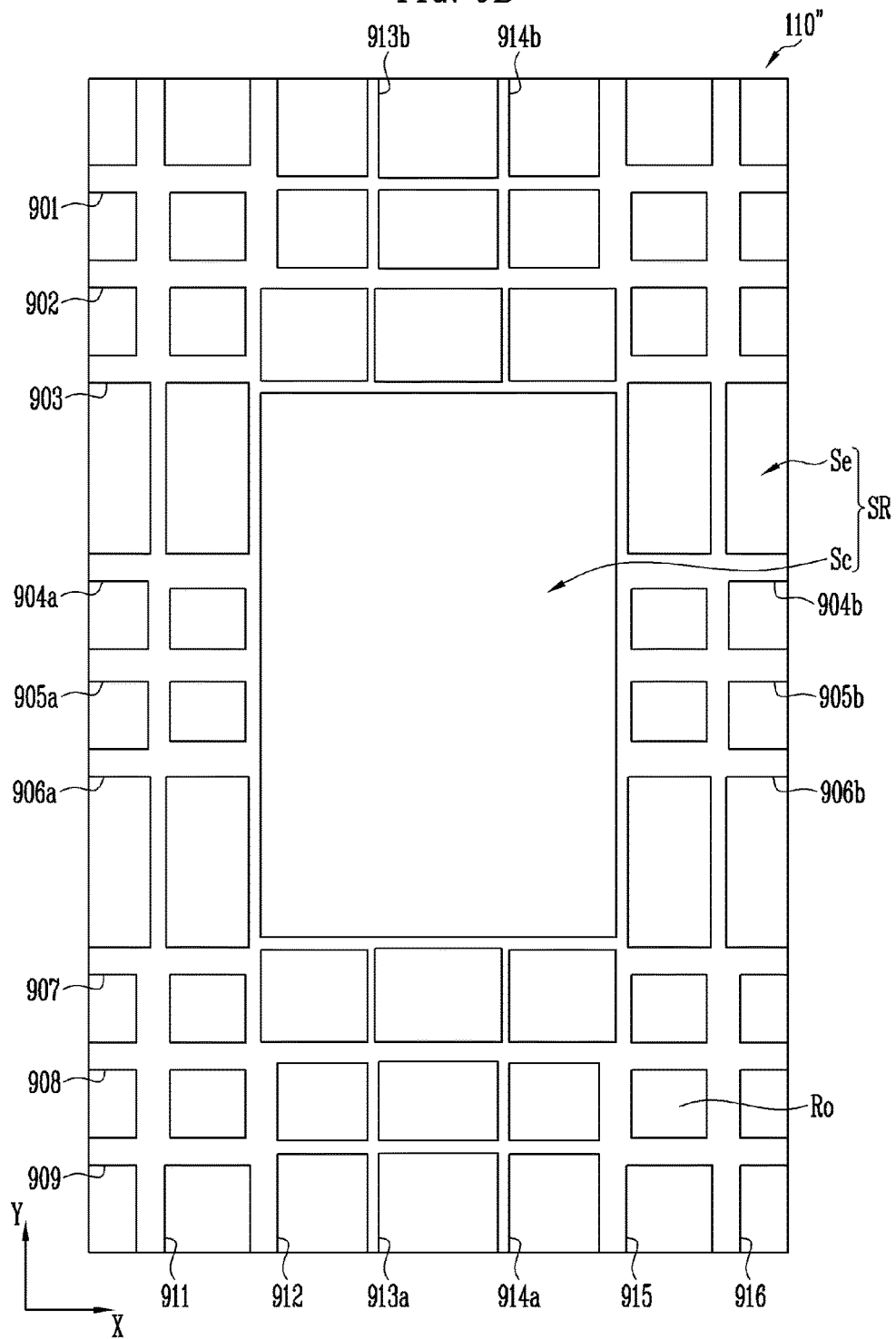

FIGS. 9A, 9B, and 9C are diagrams for describing a first conductor according to another exemplary embodiment of the present disclosure.

For convenience of the description, FIG. 9A illustrates only a pressure sensing region SR without showing a first conductor 110", FIG. 9B illustrates the pressure sensing region SR based on the first conductor 110" existing in an outer region Se, and FIG. 9C illustrates the pressure sensing region SR together with the first conductor 110" existing in a center region Sc.

Referring to FIGS. 9A to 9C, the first conductor 110" according to another exemplary embodiment of the present disclosure may be positioned in the pressure sensing region SR.

In this case, the pressure sensing region SR may include a center region Sc, and an outer region Se positioned at an outer side of the center region Sc. Particularly, the center region Se may have a form surrounding the center region Sc.

Referring to FIG. 9B, the first conductor 110" may be positioned in the outer region Se, and may include first main conductive lines 901 to 909 and second main conductive lines 911 to 916 which cross each other.

The first main conductive lines 901 to 909 may extend in a first direction (for example, an X-axis direction).

The second main conductive lines 911 to 916 may extend in a second direction (for example, a Y-axis direction) crossing the first direction.

Accordingly, the first main conductive lines 901 to 909 may cross the second main conductive lines 911 to 916, and the crossing portions may be connected to each other.

Further, a plurality of opening regions Ro may be formed between the first main conductive lines 901 to 909 and the second main conductive lines 911 to 916.

The first main conductive lines 901 to 909 may be formed to have different widths according to positions thereof.

For example, portions of the first first main conductive line 901, the second first main conductive line 902, and the third first main conductive line 903 positioned between the second second main conductive line 912 and the fifth second main conductive line 915 may have smaller widths than those of other portions.

Similarly, portions of the seventh first main conductive line 907, the eighth first main conductive line 908, and the ninth first main conductive line 909 positioned between the second second main conductive line 912 and the fifth second main conductive line 915 may have smaller widths than those of other portions.

Fourth first main conductive lines 904a and 904b are separated by the center region Sc, fifth first main conductive lines 905a and 905b are separated by the center region Sc, and sixth first main conductive lines 906a and 906b are separated by the center region Sc.

The second main conductive lines 911 to 916 may be formed to have different widths according to positions thereof.

For example, a portion of the first second main conductive line 911 positioned between the third first main conductive line 903 and the seventh first main conductive line 907 may have a smaller width than those of other portions.

Likewise, a portion of the sixth second main conductive line 916 positioned between the third first main conductive line 903 and the seventh first main conductive line 907 may have a smaller width than those of other portions.

Further, a portion of the second second main conductive line 912 positioned between the second first main conductive line 902 and the eighth first main conductive line 908 may have a smaller width than those of other portions.

Likewise, a portion of the fifth second main conductive line 915 positioned between the second first main conductive line 902 and the eighth first main conductive line 908 may have a smaller width than those of other portions.

Third second main conductive lines 913a and 913b are separated by the center region Sc, and fourth second main conductive lines 914a and 914b are separated by the center region Sc.

Referring to FIG. 9C, the first conductor 110" according to another exemplary embodiment of the present disclosure may further include first protruding conductive lines 931 and 932, a first connection conductive line 940, a second connection conductive line 950, and second protruding conductive lines 961, 962, 963, and 964.

The first protruding conductive lines 931 and 932 may extend from a pair of first main conductive lines 903 and 907 into the center region Sc.

For example, the first first protruding conductive line 931 may extend from the third first main conductive line 903 downward in the view of FIG. 9C, and the second protruding conductive line 932 may extend upward from the seventh first main conductive line 907.

The first protruding conductive lines 931 and 932 may have various shapes, for example, a bracket or "[" shape as illustrated in FIG. 9C.

The first connection conductive line 940 may be positioned in the center region Sc, and may be connected between the first protruding conductive lines 931 and 932.

The second connection conductive line 950 may be connected between the second protruding conductive lines 912 and 915 adjacent to the center region Sc.

For example, one end of the second connection conductive line 950 may be connected to the second second main conductive line 912, and the other end of the second connection conductive line 950 may be connected to the fifth second main conductive line 915.

The second protruding conductive lines 961, 962, 963, and 964 may extend from a pair of second main conductive lines 912 and 915 adjacent to the center region Sc to the center region Sc.

For example, each of the first second protruding conductive line 961 and the second second protruding conductive line 962 may extend from the second second main conductive line 912, and in this case, the second connection conductive line 950 may be disposed between the first second protruding conductive line 961 and the second second protruding conductive line 962.

Further, each of the third second protruding conductive line 963 and the fourth second protruding conductive line 964 may extend from the fifth second main conductive line 915, and in this case, the second connection conductive line 950 may be disposed between the third second protruding conductive line 963 and the fourth second protruding conductive line 964.

The first conductor 110" may be formed as a single electrode having a single output channel.

Figure 10:
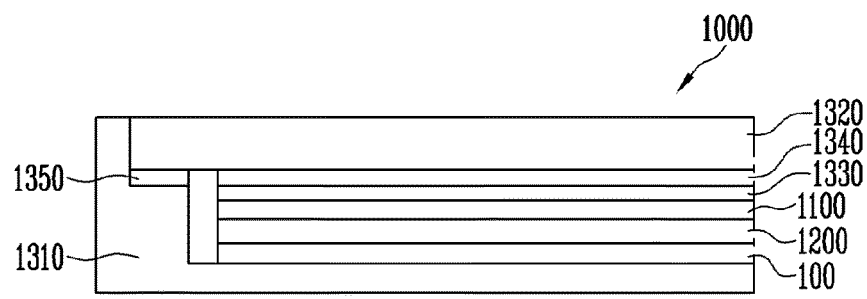
FIG. 10 is a diagram illustrating a display device according to an exemplary embodiment of the present disclosure.

FIG. 10 is a diagram illustrating a display device according to an exemplary embodiment of the present disclosure.

Referring to FIG. 10, a display device 1000 according to the exemplary embodiment of the present disclosure may include a touch sensor 1100, a display panel 1200, a pressure sensor 100, and a bracket 1310.

The touch sensor 1100, the display panel 1200, the pressure sensor 100, and other components may be accommodated inside the bracket 1310.

Further, the display device 1000 according to the exemplary embodiment of the present disclosure may further include a window 1330.

In this case, a polarizing plate 1320 may be positioned at a lower side of the window 1330, and a first attachment member 1340 may be positioned between the window 1330 and the polarizing plate 1320. However, the polarizing plate 1320 may be omitted as necessary.

Further, the window 1330 may be combined with the bracket 1310 through a second attachment member 1350.

The first attachment member 1340 and the second attachment member 1350 may be implemented as an optically transparent adhesive, other resins, a tape, and the like.

Figure 11A:
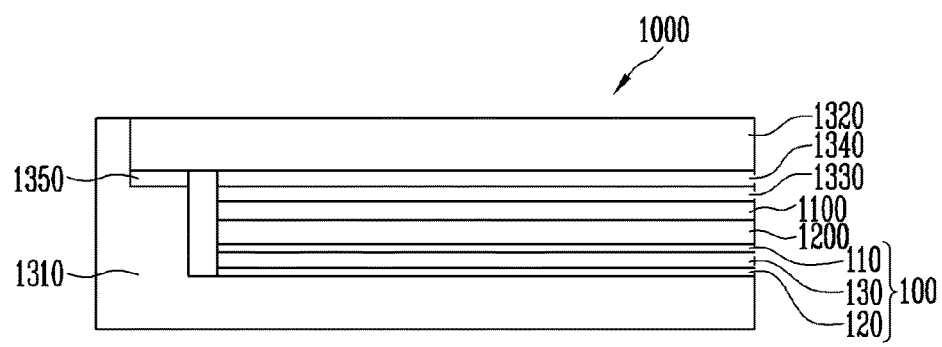
FIG. 11A is a diagram illustrating a display device including a pressure sensor according to an exemplary embodiment of the present disclosure.

FIG. 11A is a diagram illustrating a display device including a pressure sensor according to an exemplary embodiment of the present disclosure.

Referring to FIG. 11A, a pressure sensor 100 according to the exemplary embodiment of the present disclosure may include a first conductor 110, a second conductor 120, and an insulating member 130.

Particularly, the second conductor 120 may be present as a separate constituent element, and in this case, the second conductor 120 may be positioned at a lower portion of the bracket 1310.

The pressure sensor 100 has been already described in detail, so that redundant detailed description thereof will be omitted.

Figure 11B:
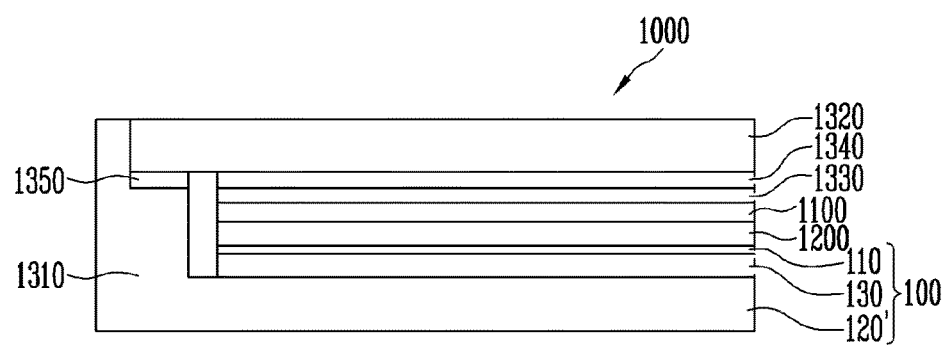
FIG. 11B is a diagram illustrating a display device including a pressure sensor according to another exemplary embodiment of the present disclosure.

FIG. 11B is a diagram illustrating a display device including a pressure sensor according to another exemplary embodiment of the present disclosure.

Referring to FIG. 11B, a pressure sensor 100 according to the exemplary embodiment of the present disclosure may include a first conductor 110, a second conductor 120', and an insulating member 130.

Particularly, in the pressure sensor 100 according to the exemplary embodiment of the present disclosure, a part of the bracket 1310 may be utilized as the second conductor 120'.

To this end, the bracket 1310 may include a material having conductivity. Particularly, when a portion of the bracket 1310 positioned at a lower side of the first conductor 110 has conductivity, the corresponding part may be utilized as the second conductor 120'.

According to the aforementioned structure, repeated configurations may be removed, thereby decreasing a thickness and manufacturing cost of the display device 1000.

Figure 12:
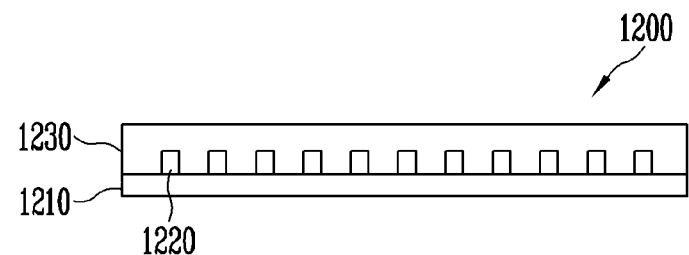
FIG. 12 is a diagram illustrating a display panel according to an exemplary embodiment of the present disclosure.

FIG. 12 is a diagram illustrating a display panel according to an exemplary embodiment of the present disclosure.

Referring to FIG. 12, the display panel 1200 according to the exemplary embodiment of the present disclosure may include a substrate 1210, pixels 1220, and an encapsulation layer 1230.

A plurality of pixels 1220 may be positioned on the substrate 1210. Further, the encapsulation layer 1230 may be positioned on the pixels 1220 and the substrate 1210.

As an example, the substrate 1210 may be formed of an insulating material, such as glass or a resin. Further, the substrate 1210 may be formed of a material having flexibility so as to be bendable or foldable, and may have a single-layer structure or a multi-layer structure.

For example, the substrate 1210 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, the material of the substrate 1210 may vary, and may alternatively be formed of Fiber Glass Reinforced Plastic (FRP), and/or the like.

The pixels 1220 may emit light under the control of a display driver (not illustrated), and may be protected by the encapsulation layer 1230.

The encapsulation layer 1230 may prevent the permeation of moisture, oxygen, and the like.

In this case, the encapsulation layer 1230 may include at least one of glass, an organic material, and an inorganic material, and may have a single structure or a multi-layer structure.

For example, the encapsulation layer 1230 may have a multi-layer structure including one or more organic layers and one or more inorganic layers.

Figure 13A:
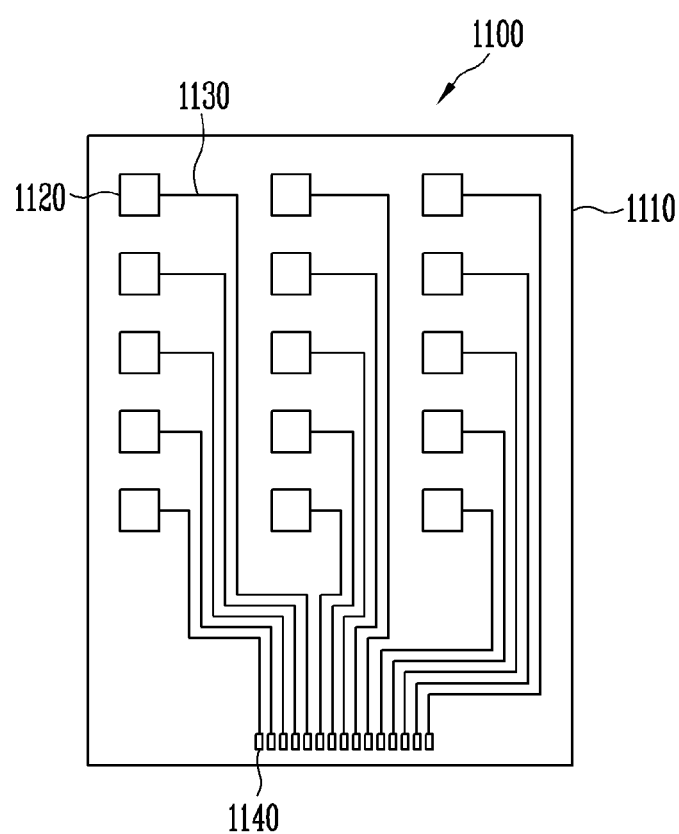
FIGS. 13A and 13B are diagrams illustrating a touch sensor according to an exemplary embodiment of the present disclosure.
Figure 13B:
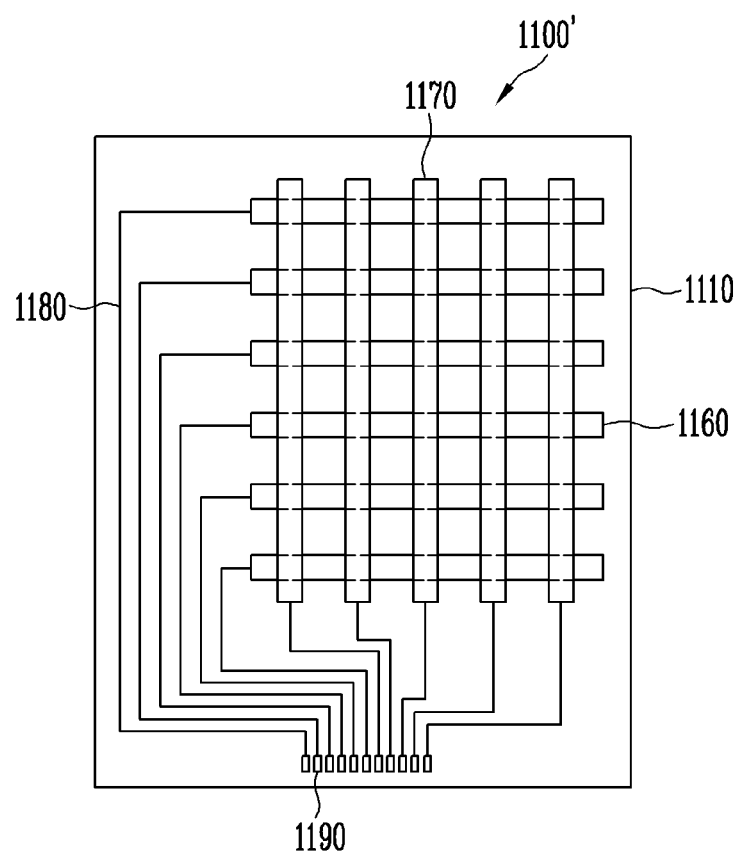

The organic layer may include a fluoride-based carbon compound, such as polyacryl, polyimide, and Teflon, and an organic insulating material, such as poly epoxy and benzocyclobutene, while inorganic layer may include polysiloxane, a silicon nitride, a silicon oxide, and an inorganic insulating material including an aluminum oxide FIGS. 13A and 13B are diagrams illustrating a touch sensor according to an exemplary embodiment of the present disclosure. Particularly, FIG. 13A illustrates a self-capacitive touch sensor 1100, and FIG. 13B illustrates a mutual capacitive touch sensor 1100'.

Referring to FIG. 13A, the touch sensor 1100 according to the exemplary embodiment of the present disclosure may be a self-capacitive touch sensor.

Further, the touch sensor 1100 may include a plurality of touch electrodes 1120 and wires 1130.

The touch electrodes 1120 may be positioned on a substrate 1110, and may include a conductive material.

In the exemplary embodiment of the present disclosure, the conductive material may include a metal or an alloy thereof. The metal may include gold (Au), silver (Ag), aluminum (Al), molybdenum (Mo), chrome (Cr), titanium (Ti), nickel (Ni), neodymium (Nd), copper (Cu), platinum (Pt), and the like.

In the meantime, the touch electrodes 1120 may be formed of a transparent conductive material. The transparent conductive material may include a silver nano wire (AgNW), an Indium Tin Oxide (ITO), an Indium Zinc Oxide (IZO), an Antimony Zinc Oxide (AZO), an Indium Tin Zinc Oxide (ITZO), a Zinc Oxide (ZnC), a Tin Oxide ($SnO_2$), a carbon nano tube, a graphene, and the like. The touch electrodes 1120 may be formed in a single layer or a multi-layer configuration.

The substrate 1110 may be formed of an insulating material, such as glass or a resin. Further, the substrate 1110 may be formed of a material having flexibility so as to be bendable or foldable, and may have a single-layer structure or a multi-layer structure.

For example, the substrate 1110 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, the material of the substrate 1110 may vary, and may instead be formed of Fiber Glass Reinforced Plastic (FRP), and/or the like.

The substrate 1110 may be formed of a separate substrate, or various constituent elements included in the display device. For example, the substrate 1110 may be the encapsulation layer 1230 included in the display panel 1200.

The wires 1130 may be connected between the touch electrodes 1120 and pads 1140. Further, the wires 1130 may be connected to a sensor controller (not illustrated) through the pads 1140.

When a touch is input into the touch sensor 1110, self-capacitance of the touch electrodes 1120 related to the touch is changed, so that the sensor controller may detect a touch position by using signals output from the touch electrodes 1120.

Referring to FIG. 13B, the touch sensor 1100' according to another exemplary embodiment of the present disclosure may be a mutual-capacitive sensor.

Further, the touch sensor 1100' may include first touch electrodes 1160, second touch electrodes 1170, and wires 1180.

The plurality of first touch electrodes 1160 may extend in a first direction and be successively arranged along a second direction crossing the first direction.

The second touch electrodes 1170 are spaced apart from the first touch electrodes 1160, so that the second touch electrodes 1170 may be operated as mutual capacitive sensors together with the first touch electrodes 1160.

To this end, the second touch electrodes 1170 may be disposed so as to cross the first touch electrodes 1160.

For example, the plurality of second touch electrodes 1170 may extend in the second direction and be successively arranged along the first direction.

By the disposition of the first touch electrodes 1160 and the second touch electrodes 1170, mutual capacitance between the first touch electrodes 1160 and the second touch electrodes 1170 is formed, and when a touch is applied to the touch sensor 1100', mutual capacitance related to the touch is changed.

In order to prevent electrical contact between the first touch electrodes 1160 and the second touch electrodes 1170, insulating layers (not illustrated) may be formed between the first touch electrodes 1160 and the second touch electrodes 1170.

The insulating layers may be formed between the entireties of the first touch electrodes 1160 and the second touch electrodes 1170, or may be locally formed at crossing portions of the first touch electrodes 1160 and the second touch electrodes 1170.

The first touch electrodes 1160 and the second touch electrodes 1170 may be formed of a transparent conductive material, but may alternatively be formed of other conductive materials, such as an opaque metal.

For example, the first touch electrodes 1160 and the second touch electrodes 1170 may be formed of the same material as that of the aforementioned touch electrode 1120.

In FIG. 13B, it is illustrated that the first touch electrodes 1160 and the second touch electrodes 1170 have bar shapes, but the shapes of the first touch electrodes 1160 and the second touch electrodes 1170 may vary.

Further, the first touch electrodes 1160 and the second touch electrodes 1170 may have mesh structures so as to have flexibility.

The wires 1180 may be connected between the touch electrodes 1160 and 1170, and the pads 1190. Further, the wires 1180 may be connected to a sensor controller (not illustrated) through the pads 1190.

The first touch electrodes 1160 may receive a driving signal from the sensor controller, and the second touch electrodes 1170 may output a sensing signal reflecting a change of capacitance to the sensor controller.

Accordingly, the sensor controller may detect a touch position by using the sensing signals output from the second touch electrodes 1170.

Here, the capacitive touch sensors 1100 and 1100' are mainly described, but touch sensors of other types may also be adopted.

Further, the touch sensors 1100 and 1100' may be implemented as sensors of various types, for example, resistive type, infrared beam type, surface acoustic wave type, integral strain gauge type, and piezo type sensors.

It will be appreciated by those skilled in the art that the present disclosure as described above may be implemented into other specific forms without departing from the technical spirit thereof or essential characteristics. Thus, it is to be appreciated that the exemplary embodiments described above are intended to be illustrative in every sense, and not restrictive. The scope of the present disclosure is represented by the claims to be described below rather than the detailed description, and it is to be interpreted that the meaning and scope of the claims and all the changes or modified forms derived from the equivalents thereof come within the scope of the present disclosure. Various features of the above described and other embodiments can thus be mixed and matched in any manner, to produce further embodiments consistent with the invention.

What is claimed is:

1. A pressure sensor, comprising:
   a first conductor;
   a second conductor spaced apart from the first conductor; and
   an elastic member positioned between the first conductor and the second conductor,
   wherein the first conductor comprises a first loop-type conductive line, an internal conductive line surrounded by the first loop-type conductive line, a first straight conductive line section directly connected to a straight section of the first loop-type conductive line and oriented oblique relative to the straight section of the first loop-type conductive line, a second loop-type conductive line surrounding each of the first loop-type conductive line and the first straight conductive line section and directly connected to the first straight conductive line section, and a third loop-type conductive line surrounding the second loop-type conductive line,
   wherein the straight section of the first loop-type conductive line is positioned between two corners of the first loop-type conductive line, and
   wherein the internal conductive line is oriented perpendicular to the straight section of the first loop-type conductive line, is electrically connected through the straight section of the first loop-type conductive line to the first straight conductive line section, and is oriented oblique relative to the first straight conductive line section.

2. The pressure sensor of claim 1, wherein the first conductor further comprises:
   a plurality of connection conductive lines each connected to the first loop-type conductive line, the second loop-type conductive line, and the third loop-type conductive line.

3. The pressure sensor of claim 2, wherein the first conductor further comprises:
   a fourth loop-type conductive line surrounding the third loop-type conductive line.

4. The pressure sensor of claim 3, wherein the connection conductive lines extend from the first loop-type conductive line to the fourth loop-type conductive line.

5. The pressure sensor of claim 4, wherein the first conductor further includes auxiliary conductive lines extending from the second loop-type conductive line to the fourth loop-type conductive line.

6. The pressure sensor of claim 4, wherein the first conductor further includes a plurality of additional conductive lines connected between the connection conductive lines.

7. The pressure sensor of claim 6, wherein at least one additional conductive line is positioned between the first loop-type conductive line and the second loop-type conductive line.

8. The pressure sensor of claim 2, wherein at least one of the connection conductive lines are oblique relative to an edge of the pressure sensor in a plan view of the pressure sensor.

9. The pressure sensor of claim 3, wherein at least a part of the second loop-type conductive line has a larger width than a width of the first loop-type conductive line.

10. The pressure sensor of claim 3, wherein at least a part of the third loop-type conductive line has a larger width than a width of the second loop-type conductive line.

11. The pressure sensor of claim 1, wherein capacitance formed by the first conductor and the second conductor is 100 pF or less.

12. A pressure sensor, comprising:
    a first conductor;
    a second conductor spaced apart from the first conductor; and
    an elastic member positioned between the first conductor and the second conductor,
    wherein the first conductor includes a first loop-type conductive line, a first straight conductive line section, a second straight conductive line section, and a second loop-type conductive line,
    wherein the second loop-type conductive line is electrically connected through each of the first straight conductive line section and the second straight conductive line section to the first loop-type conductive line,
    wherein each of the first straight conductive line section and the second straight conductive line section is directly connected to a straight section of the first loop-type conductive line, is positioned between two ends of the straight section of the first loop-type conductive line, is directly connected to a straight section of the second loop-type conductive line, and is positioned between two ends of the straight section of the second loop-type conductive line,
    wherein the second straight conductive line section is oriented perpendicular to at least one of the straight section of the first loop-type conductive line and the straight section of the second loop-type conductive line, and
    wherein the first straight conductive line section is oriented oblique relative to the second straight conductive line section.

13. A display device, comprising:
    a display panel;
    a touch sensor positioned at a first side of the display panel and configured to detect a position of a touch; and
    a pressure sensor positioned at a second side of the display panel and configured to detect a pressure of the touch,
    wherein the pressure sensor includes:
    a first conductor;
    a second conductor spaced apart from the first conductor; and
    an elastic member positioned between the first conductor and the second conductor,
    wherein the first conductor comprises a first loop-type conductive line and a second loop-type conductive line, and
    wherein two opposite sections of the first loop-type conductive line are positioned between two opposite sections of the second loop-type conductive line and are respectively wider than the two opposite sections of the second loop-type conductive line in a first direction.

14. The display device of claim 13, further comprising:
a bracket configured to accommodate the display panel, the touch sensor, and the pressure sensor.

15. The display device of claim 14, wherein the bracket comprises the second conductor.

16. The display device of claim 13, wherein two opposite segments of the first loop-type conductive line are positioned between two opposite segments of the second loop-type conductive line and are respectively wider than the two opposite segments of the second loop-type conductive line in a second direction perpendicular to the first direction.

17. The display device of claim 16, wherein the first and second loop-type conductive lines each have a quadrangular shape.

18. The display device of claim 13, wherein the first conductor further comprises:
connection conductive lines electrically connected to each of the first loop-type conductive line and the second loop-type conductive line;
a third loop-type conductive line positioned inside the first loop-type conductive line; and
a fourth loop-type conductive line positioned inside the third loop-type conductive line.

19. The display device of claim 18, wherein the connection conductive lines extend from the first loop-type conductive line to the fourth loop-type conductive line.

20. The display device of claim 19, wherein the first conductor further includes:
auxiliary conductive lines extending from the second loop-type conductive line to the fourth loop-type conductive line.

21. The display device of claim 19, wherein the first conductor further includes a plurality of additional conductive lines connected between the connection conductive lines.

22. The display device of claim 21, wherein at least one additional conductive line is positioned between the first loop-type conductive line and the second loop-type conductive line.

23. The display device of claim 18, wherein the first conductor further includes lattice-shaped internal conductive lines which are positioned inside of the first loop-type conductive line, and are connected to the first loop-type conductive line.

24. The display device of claim 18, wherein the first conductor further comprises a straight conductive line section, wherein the straight conductive line section is surrounded by the third loop-type conductive line, is directly connected to each of the fourth loop-type conductive line and the third loop-type conductive line, and is oriented oblique relative to each of the two opposite sections of the third loop-type conductive line.

25. The display device of claim 13, wherein the first conductor further comprises a straight conductive line section, wherein the straight conductive line section is surrounded by the second loop-type conductive line, is directly connected to each of the first loop-type conductive line and the second loop-type conductive line, and is oriented oblique relative to each of the two opposite sections of the second loop-type conductive line.

* * * * *